United States Patent [19]
Gaskell

[11] Patent Number: 5,685,642
[45] Date of Patent: Nov. 11, 1997

[54] MOUNTING FOR A BIMETAL COIL THERMOMETER AND HAVING AN INTEGRAL FEATURE ASSISTING CALIBRATION

[75] Inventor: Alfred J. Gaskell, Hopkins, Minn.

[73] Assignee: Honeywell Inc., Minneapolis, Minn.

[21] Appl. No.: 311,645

[22] Filed: Sep. 23, 1994

[51] Int. Cl.$^6$ .............................. G01K 15/00; G01K 5/00
[52] U.S. Cl. ............................................. 374/206; 374/1
[58] Field of Search ............................. 374/206, 208, 374/205, 207, 198, 1; 411/349; 24/590, 591, 592; 403/348, 349; 73/431

[56] References Cited

U.S. PATENT DOCUMENTS

| | | | |
|---|---|---|---|
| 2,617,166 | 11/1952 | Kaufmann | 403/349 X |
| 2,668,446 | 2/1954 | Kraemer | 374/206 |
| 3,631,341 | 12/1971 | Kazuno | 324/106 |
| 3,818,763 | 6/1974 | Berleyoung et al. | 374/206 |
| 3,860,209 | 1/1975 | Strecker | 24/590 X |
| 4,081,999 | 4/1978 | Lenken | 374/106 |
| 4,400,856 | 8/1983 | Tseng | 24/590 |
| 4,527,760 | 7/1985 | Salacuse | 24/590 X |
| 4,595,301 | 6/1986 | Taylor | 374/207 |
| 4,653,708 | 3/1987 | Rich | 403/348 X |
| 4,762,437 | 8/1988 | Mitomi | 403/348 X |
| 5,121,109 | 6/1992 | Murphy, Jr. et al. | 340/688 |
| 5,154,226 | 10/1992 | Porter et al. | 165/11.1 |
| 5,261,758 | 11/1993 | Vranish | 403/348 |
| 5,439,169 | 8/1995 | Rabel | 374/206 X |

*Primary Examiner*—George M. Dombroske
*Assistant Examiner*—Paul D. Amrozowicz
*Attorney, Agent, or Firm*—Edward L. Schwarz

[57] ABSTRACT

An analog thermometer of the bimetal coil type has a rotatable hub carrying the bimetal coil. The thermometer is calibrated to indicate exact ambient temperature by rotating the hub to the proper angular position. The hub and the base supporting the hub are designed to allow fabrication as a unitary molded plastic article. A preferred embodiment of this design comprises at least four inwardly projecting tabs carried in an opening in the base and spaced from each other around the periphery of the hole. The hub has at least four outwardly projecting tabs spaced about its periphery. The angles which each of the hub's tabs and the hole's tabs subtend and the tabs' axial positions allow the hub to be rotated to interleave the tabs, restraining the hub in a predetermined axial position and frictionally fixing the hub in the angular position for calibration.

15 Claims, 4 Drawing Sheets

MOUNTING FOR A BIMETAL COIL THERMOMETER AND HAVING AN INTEGRAL FEATURE ASSISTING CALIBRATION

BACKGROUND OF THE INVENTION

The bimetal coil analog thermometer is a simple and ubiquitous design. It is expensive and satisfactorily accurate for room temperature indication. Such a thermometer relies on the relationship between temperature and the angular position of a pointer carried at one end of the bimetal coil, to indicate the ambient temperature. The other end of the bimetal coil has an attachment feature by which the coil is attached to a base which supports the coil. A scale which indicates the temperature corresponding to each angular position of the pointer is supported adjacent to the pointer in some manner. Typically, the pointer forms a part of the outer end of the coil, and the inner end carries the attachment feature.

It is difficult during the manufacturing and installation of individual bimetal coils, to assure the precisely correct angular position of a particular coil's pointer relative to the scale. Accordingly, some sort of calibration procedure is required to provide acceptable accuracy for the temperature indication. The requirement for low cost for the thermometer dictates that the entire bimetal coil support structure itself including the calibration mechanism be inexpensive to construct and quick and easy to assemble. There are a number of possibilities for accomplishing this calibration function. For example, a crude approach would be to simply bend the coil to place the pointer in the proper position, but this may damage the response of the coil to temperature changes if for example adjacent turns of the coil touch after such bending. Another possibility is to move the scale to allow the pointer to the indicate the ambient temperature. A third approach and one that I find to be the most convenient way to calibrate a bimetal coil thermometer is to rotate the attachment feature to the angular position where the pointer accurately indicates the ambient temperature on the scale.

Such a thermometer lends itself admirably to fabrication of its base from an inexpensive molded plastic. The only non-plastic part needed then is the bimetal coil. A coil support feature can be molded into the base to which is attached the bimetal coil's attachment feature. The support feature can be designed to be rotatable to allow calibration of the thermometer.

One axiom for minimizing cost when fabricating devices of any type from plastic parts is to reduce the number of parts to the minimum possible. This reduces cost by reducing the number of molds required and simplifying and increasing the speed of assembly. Thermometers having plastic housings have in the past required a number of parts for the coil support to provide for calibration.

BRIEF DESCRIPTION OF THE INVENTION

I have developed a novel support for a helical thermometer bimetal coil of the type having internal and external ends, an interior attachment feature forming a part of the internal end and a pointer forming a part of the external end. The design of this support allows its fabrication in one of its embodiments as a unitary plastic piece and still provides for calibration of the thermometer.

This support comprises a base having an opening having an axis. The base includes in the opening at least two radially and centrally projecting base tabs disposed around the periphery of the opening, each base tab having load surfaces disposed in a substantially normal position to the axis with load surfaces of adjacent base tabs in one embodiment facing in opposite directions. In another possible embodiment, each tab has two load surfaces, the two load surfaces on a tab facing in opposite directions. The base tabs have ends collectively defining around the axis a clearance space having a generally circular periphery.

The support further includes a generally cylindrical hub having an axis aligned with the base opening's axis and a cross section shape allowing rotation of the hub within the clearance space when so aligned. The hub includes a coil support feature for mating with the interior attachment feature of the bimetal coil and for supporting the bimetal coil. The hub is made from some type of material which elastically deflects, styrene plastic being what I presently prefer.

The hub also includes at least first and second radially and outwardly projecting hub tabs as well as either third and fourth radially projecting hub tabs or a hub flange. Each hub tab or flange includes a load surface. The first and second hub tabs are axially offset from the third and fourth hub tabs or the flange, axially positioning them on the hub to interferingly mate the load surface of each with a corresponding load surface of a base tab over a range of angular positions of the hub. The hub tabs and flange are relatively thin compared to their radial length so as to allow elastic deflection of the individual hub tabs' ends in the axial direction.

The direction faced by each of the load surfaces of the first and second hub tabs, and the third and fourth hub tabs or the flange, is generally normal to the hub axis. The load surface of the third and fourth hub tabs or the flange face in the direction opposite to the direction faced by the first and second hub tabs' or the flange's load surfaces. With adjacent base tabs having load surfaces facing in opposite directions, and with at least two sets of these oppositely facing base tab load surfaces, rotating the hub rotates the corresponding hub tab and flange load surfaces so as to engage them and interferingly mate them with the base tab's load surfaces. The axial positions of the hub tabs and flange are such that slight axial deflections of each of the hub tabs and flange occur as their load surfaces are rotated into engagement with the load surfaces of the base's tabs. When these load surfaces are so interferingly mated, the hub is restrained from axial movement and frictionally constrained from rotational movement by the interaction between the base tabs and the hub tabs and flange. The mating with interference of each base tab load surface with a corresponding hub tab or flange load surface creates a mounting of the hub within the clearance space which thus holds the hub in a selected position. The frictional restraint of the hub allows its rotation to a desired angular position which properly orients the pointer of the bimetal coil on the temperature scale to thereby calibrate the thermometer of which these elements are a part. I prefer to provide an adjustment feature on the hub in which an adjustment tool such as an Allen (hex) wrench or a screwdriver can be inserted to make the adjustment step more accurate and easier.

In the embodiment described above, the hub's tabs are axially offset from each other. It is also possible to locate the axially offset tabs and flange on the base as well, with the axially aligned tabs on the hub.

In my preferred embodiment, I provide four tabs carried on the hub and four tabs around the periphery of the base's opening. An opposing pair of the four hub tabs are axially offset from the other pair of the hub tabs. By properly configuring the base and hub tabs in this embodiment as to size and angular position, it is possible to mold the base and hub from plastic as a single unit and in a single step with a simple two piece injection mold. In such a configuration of the tabs, the base tabs form a first group of tabs and the hub tabs form a second group of tabs. Each tab has sides extending radially with respect to the axes. Adjacent sides of adjacent tabs in one group of tabs define a space within which fits an axially directed projection of a tab from the other group of tabs. During molding of the support, the hub is angularly positioned so that this projection from each tab actually is within the space defined by two adjacent tabs from the other group. That is, immediately after the support has been formed, each tab is completely within a "window" formed by two adjacent tabs of the other group. The hub is held in its original molded position by a number of webs, thin plastic beams which connect between the hub and the base. When calibration occurs, torque applied to rotate the hub easily breaks these posts as the tabs move into mating interference with each other. The interference fit between the hub's tabs and the base's tabs holds the hub in the position to which it is finally rotated, and which is intended to be the position at which the thermometer is properly calibrated.

DESCRIPTION OF THE PREFERRED EMBODIMENTS

Figure 1:
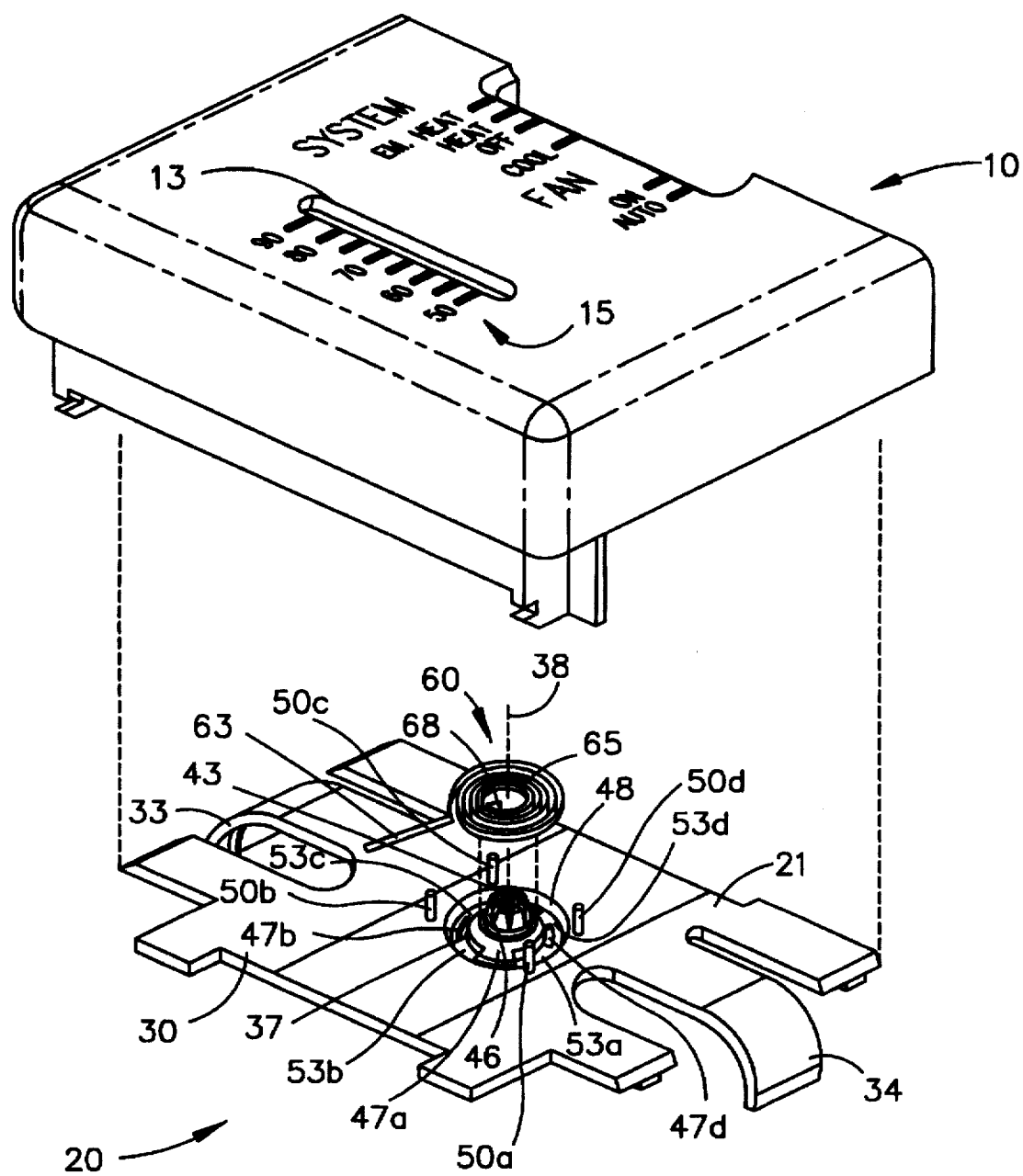
FIG. 1 is a perspective view of the front side of a thermometer with the parts thereof shown in exploded form.

Turning first to FIG. 1, the thermometer shown in exploded form has a housing 10 in which is to be mounted a bimetal coil support 20 which in turn is intended to support a bimetal coil 60. The support 20 with bimetal coil 60 mounted to it is to be assembled into housing 10. The housing 10 shown in FIG. 1 is part of a larger housing which contains a thermostat. During assembly as support 20 is inserted into housing 10, resilient fingers 33 and 34 interlock with ledges (not shown) in the interior of housing 10, locking support 20 into housing 10, and at the same time allowing support 20 to be removed if necessary. After assembly, the projecting pointer 63 of bimetal coil 60 will be visible through slot 13 of housing 10, and the adjacent scale 15 allows a person to read the ambient temperature.

As explained above, because of unavoidable variations in the manufacturing process for bimetal coil 60, it is not possible to mount every bimetal coil 60 with its internal end in a preset angular position, and still have the thermometer of which it forms a part indicate ambient temperature accurately. Apparatus constructed according to this invention provides means for rotating the entire bimetal coil 60 to an angular position which allows pointer 63 to properly indicate the ambient temperature. In the thermostat application for which these thermometers are to be used, low cost of the thermometer element is essential in order to keep the cost of the entire thermostat competitive. At the same time of course, one does not wish to provide a thermometer in a relatively long-lived and visible product which does not accurately indicate the ambient temperature.

To allow a bimetal coil thermometer which can be easily calibrated and yet is of relatively low cost, I mount bimetal coil 60 on a hub 37 forming a part of support 20. Hub 37 is mounted for rotation about an axis 38 with respect to a base 21 forming a further element of support 20. The arrangement by which hub 37 is allowed to rotate will be explained below. Bimetal coil 60 is mounted on a projection 43 of hub 37 forming a coil support feature. Bimetal coil 60 incorporates an attachment feature by which coil 60 is mounted on projection 43, and which in the embodiment shown comprises the innermost turn 65 of coil 60 along with tab 68 which radially projects inwards toward the center of the coil 60. The undeflected diameter of turn 65 is slightly smaller than the diameter of projection 43, so that when coil 60 is pushed onto projection 43, the diameter of turn 65 is increased slightly, and coil 60 is held in its selected position on projection 43 by the friction thus created. Tab 68 slides into one of the slots 46, restraining coil 60 from rotating with respect to projection 43.

Figure 3:
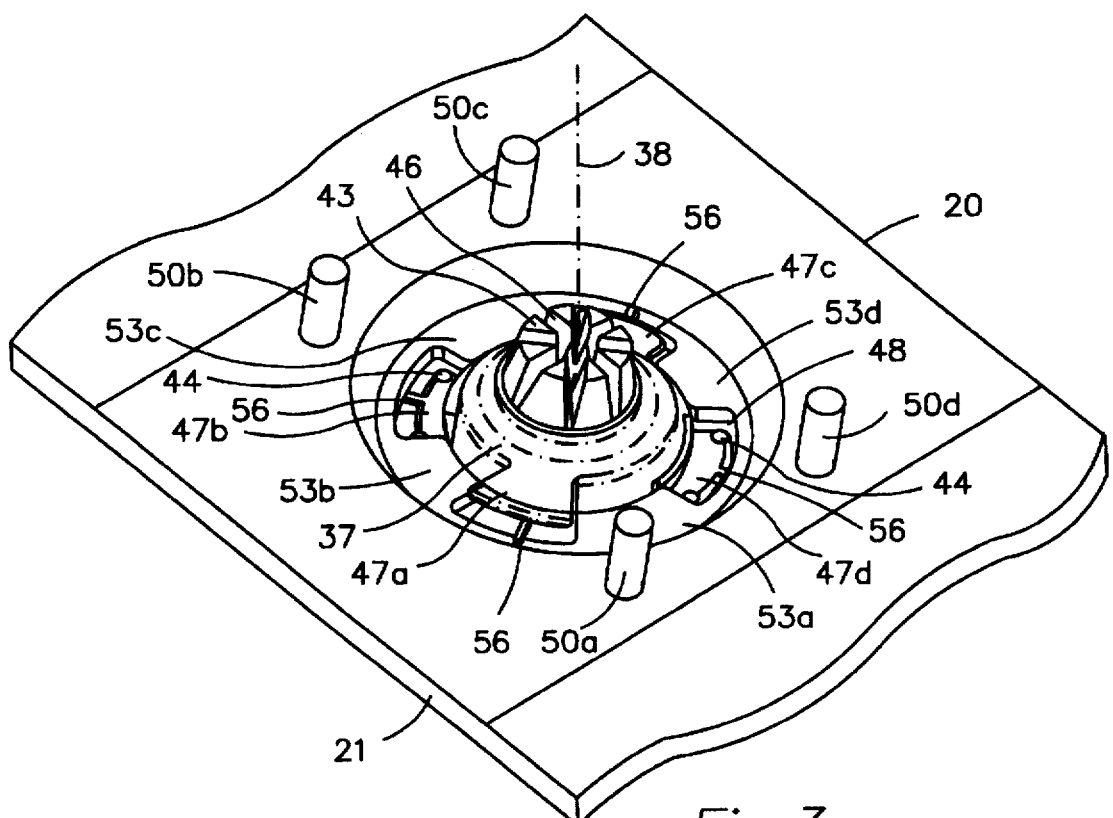
FIG. 3 is a enlarged perspective view of a detail of the front side of the bimetal coil support.

The invention is shown more clearly in FIG. 3, where the details of hub 37 and its mounting on base 21 are visible. Base 21 has an opening or aperture 48, in general outline preferably circular. Opening 48 has arranged about its periphery, a first set of at least four inwardly projecting tabs 53a–53d all of which are preferably integral with base 21. The shape and dimensions of tabs 53a–53d are such that the interior ends thereof define a space within which projection 43 of hub 37 may be placed. The edges of tabs 53a–53d which intersect with the interior ends thereof approximately coincide with radii extending from axis 38. Tabs 53a–53d are evenly spaced around the periphery of aperture 48 so as to form between each pair of them an approximately trapezoidal area defined by the adjacent edges of the adjacent tabs 53a–53d and the outer periphery of projection 43. The tabs 53a–53d themselves each have a similar trapezoidal shape defined by the interior end of the tab 53a–53d, the outer periphery of hub 37, and the approximately radial edges of each individual tab 53a–53d. The radial edges of each tab 53a–53d preferably subtend an angle approximately equal to or slightly smaller than the angle subtended by the adjacent edges of each adjacent pair of tabs 53a–53d. While it is not essential that the angle which the space between adjacent tabs 53a–53d subtends is the same as the angle which the individual tabs 53a–53d subtend, it is preferred that these angles be similar. This permits the apparatus of support 20 to provide maximum strength and resistance to mechanical loss of calibration of the thermometer of which it forms a part.

In my preferred design, tabs 53a–53d are all axially aligned with each other and of equal thickness. Each tab 53a–53d has a pair of substantially flat (planar) load surfaces normal to axis 38, with one of the load surfaces of each of the tabs 53a–53d facing toward bimetal coil 60 as shown in FIG. 1 and the other of each of tabs 53a–53d's load surfaces facing in the opposite direction. Thus, the geometry of the dimensions specified for tabs 53a–53d dictates that the set of load surfaces of tabs 53a–53d facing in one direction are coplanar and spaced from the load surfaces of tabs 53a–53d facing in the other direction by the thickness of the individual tabs 53a–53d.

Figure 5:
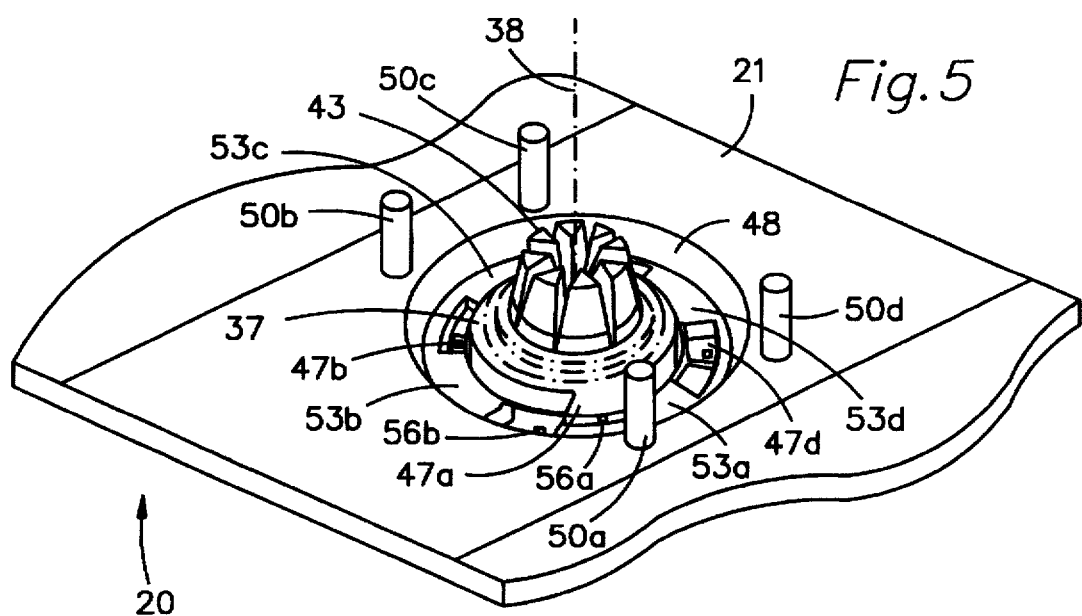
FIG. 5 is a enlarged perspective view of the front side of a detail of the bimetal coil support after calibration.
Figure 4:
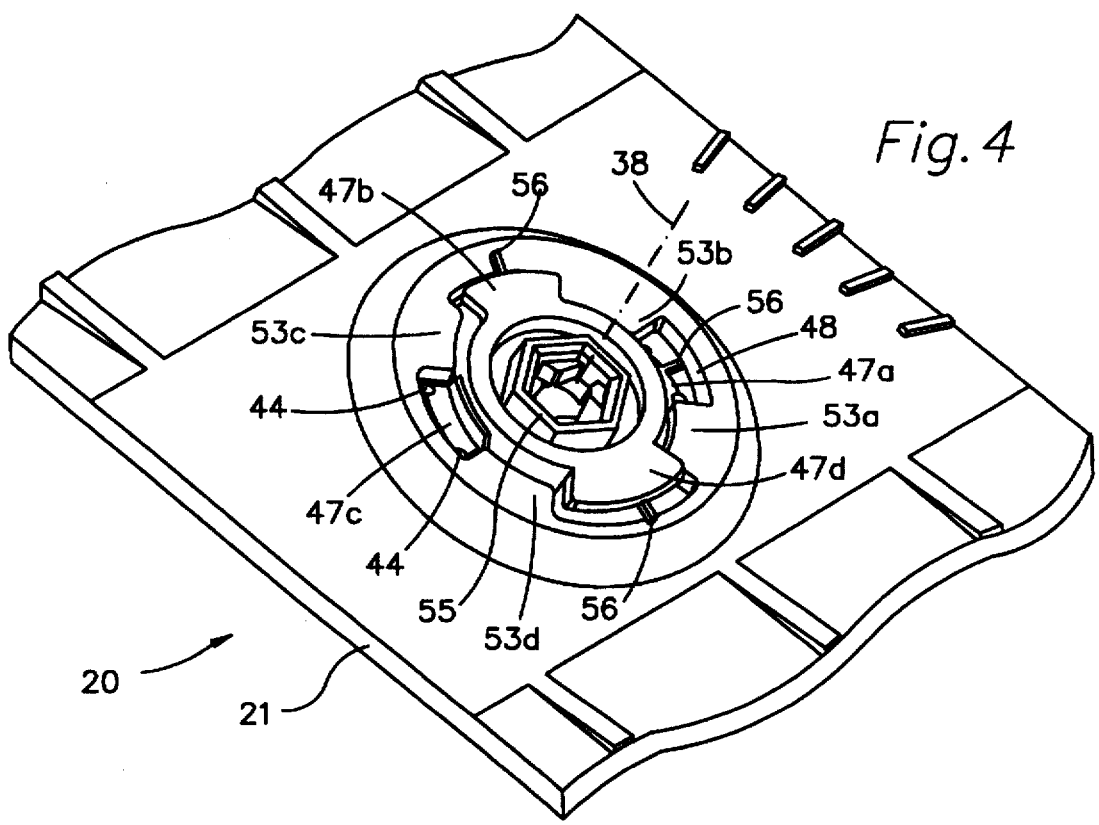
FIG. 4 is a enlarged perspective view of a detail of the rear side of the bimetal coil support.

Hub 37 includes a second set of at least four outwardly projecting tabs 47a–47d which are shown in FIGS. 3–5 in greater detail. Each of the second set of tabs 47a–47d are preferably integral with hub 37. I prefer that each of the tabs 47a–47d extend outwardly from hub 37 to very nearly the periphery of opening 48. Tabs 47a–47d also have approximately trapezoidal shapes defined by edges which extend radially with respect to axis 38, the outer end adjacent the periphery of opening 38, and the peripheral surface of hub 37. Thus, the interior and exterior edges of each tab 47a–47d are not straight lines, but rather slightly curved arc segments of circles centered on axis 38 and having the radii of the interior and exterior edges of tabs 47a–47d. Tabs 47a–47d each have a single load surface normal to axis 38, with the load surfaces of tabs 47a and 47c facing away from bimetal coil 60 as shown in FIG. 1 and the load surfaces of tabs 47b and 47d facing toward bimetal coil 60. I prefer to have small bumps or dimples 44 forming a part of each load surface of tabs 47a–47d, although this is not essential. Where dimples 44 are provided, their tips form the major load-bearing areas of the load surface.

Tabs 47a and 47c are axially located on hub 37 in an alternately staggered arrangement so as to axially align their load surfaces with the oppositely facing load surfaces of tabs 53a–53d. That is, each tab 47a–47d is axially displaced with respect to its two neighboring tabs 47a–47d. For example, tab 47b has an axial displacement from the viewer (as shown in FIGS. 1 and 3) which is greater than for tabs 47b and 47d. Tabs 47a and 47c have the same axial position and are thus axially aligned with each other, as are tabs 47b and 47d. I prefer to select the axial locations of tabs 47a–47d so as to create a slightly interfering relationship between each of the tabs 47a–47d's load surface and the load surfaces on tabs 53a–53d. That is, the plane defined by the load surfaces of tabs 47a and 47c is spaced or offset from the plane defined by tabs 47b and 47d by a measure slightly less than the thickness of each of tabs 53a–53d. This interference fit specified between these pairs of load surfaces must take into account dimples 44 if present. This axial staggering of tabs 47a–47d assumes of course that tabs 53a–53d are all in axial alignment with each other.

With this relative topology of base 21, its opening 48, and its integral tabs 53a–53d, and of hub 37 and its integral tabs 47a–47d, it is possible to rotate hub 37 relative to base 21 to an angular position as shown in FIG. 5 so that a load surface of each tab 47a–47d interferingly mates with a load surface of tab 53a–53d. Hub 37 can be rotated through a range of angular positions and still be axially retained in base 21 by the interfering mating of tabs 47a–47d and 53a–53d. In FIG. 5, hub 37 has been rotated approximately 25° counterclockwise as viewed from the top. Each of the tabs 47a–47d and 53a–53d deflects slightly when hub 37 is rotated, to thereby hold hub 37 at whatever angular position it currently occupies, to the limit of the frictional resistance to torque generated between the interfering load surfaces of tabs 47a–47d and 53a–53d. The alternately staggered or axially offset arrangement of tabs 47a–47d causes each pair of tabs with interfering load surfaces to create an axially aligned force whose is direction is opposite to the direction of the similar axial force created in each of the pairs of interferingly mated load surfaces adjacent. This pattern of alternately directed axial forces generated by these pairs of mated load surfaces axially and laterally stabilizes the position of hub 37. Bimetal coil 60 is in this manner held in the proper axial and lateral positions allowing the pointer 63 to translate along window 13 and indicate the ambient temperature.

By overcoming the frictional resistance created by the interfering load surfaces, a person can rotate hub 37 through a range of angular positions to the angular position causing pointer 63 to correctly indicate the ambient temperature, thereby calibrating the thermometer which these elements form. Given that the design of bimetal coil 60 is compatible with the temperature scale 15 on housing 10, the thermometer thus formed will accurately and consistently indicate the ambient temperature for a long period of time. I believe that dimples 44 will over time cause some cold flow of the plastic in the load surface of the tab 53a–53d against which it presses to more firmly over time lock hub 37 in its current angular position. Proper selection of the various interrelated dimensions and the material from which the hub 37 and base 21 are formed, provides further assurance that hub 37 will maintain its angular position, and therefore the thermometer's calibration. It is necessary that the angular position at which bimetal coil 60 is mounted on hub 37 relative to the angular position of tabs 47a–47d is such that there is at least some overlap of the load surfaces on tabs 47a–47d with the load surfaces on tabs 53a–53d when hub 37 is rotated to the calibration position, so that hub 37 is retained in base 21. I believe that ff there is an overlap of at least a few hundredths of an inch between mating tabs 47a–47d and 53a–53d, this will be adequate to reliably secure the position of hub 37. Thus, one can see that in this preferred design for support 20, a relatively large percentage of the entire 360° of rotation through which hub 37 can rotate, will result in a position in which hub 37 is retained in base 21.

It is important that both base 21 and hub 37 be formed of a flexible and resilient material which elastically deflects and which also has an elastic modulus which is large enough to retain hub 37 in whatever position it has been set. A material which I presently prefer is styrene plastic. For such a material I prefer that individual tabs 47a–47d and 53a–53d each extend radially from their base about 0.07 to 0.1 in. (2 to 2.5 min.) so as to create a radial overlap between each hub tab 47a–47d and base tab 53a–53d of about 0.05 in. (1.3 mm.). The thickness of tabs 47a–47d and 53a–53d may be approximately 0.03 to 0.04 in. (0.75 to 1 mm.). The opening defined by the ends of tabs 53a–53d within which hub 37 is located may be about 0.5 in. (13 mm.).

Where there are four tabs 47a–47d carried by hub 37 and four tabs 53a–53d carried on base 21 around the periphery of opening 48, I prefer to have each of the tabs subtend an angle slightly less than 45°. This allows an inexpensive and efficient manufacturing process to be described below, for forming support 20 and calibrating the thermometer of which it forms a part.

Where the manufacturing process to be described below is not to be used, it is possible to use fewer than four each of tabs 47a–47d and 53a–53d. For example one can replace the tabs 47a and 47c (or 47b and 47d) on hub 37 with a single flange at the same axial position. Tabs 53a–53d can also be replaced with two much larger tabs forming between them two diametrically opposed spaces through which the remaining two of the tabs 47a–47d can pass. Then hub 37 can be rotated to lock it into an axial position in base 21 and to calibrate the thermometer. It is thus possible to implement this invention with two tabs on each of hub 37 and base 21 and a flange on hub 37, and I believe this to be the least number of tabs and flanges with which the invention can be implemented. As a practical matter, it is no more expensive to implement the invention with four tabs on each of the hub 37 and base 21, and provides the opportunity to practice the preferred fabrication process.

While more than four tabs may be provided on each of hub 37 and support 20 when implementing the preferred fabrication process, I have found that four tabs on hub 37 and on the periphery of opening 48 is optimal. Four tabs on each of these elements provide the maximum range of hub 37 rotation throughout which hub 37 is stably retained within base 21, and provides maximum strength and frictional resistance to angular and axial movement.

It is also possible to design support 20 with tabs 47a–47d in axial alignment with each other on hub 37, in which case tabs 53a–53d must be axially staggered in the positions which they occupy around the periphery of opening 48. I prefer to axial stagger tabs 47a–47d as described for FIGS. 1–5 because the inherent axial length of hub 37 provides a simpler design with no loss of function and the potential for greater strength. Nevertheless, I consider either topology to be entirely equivalent.

Figure 2:
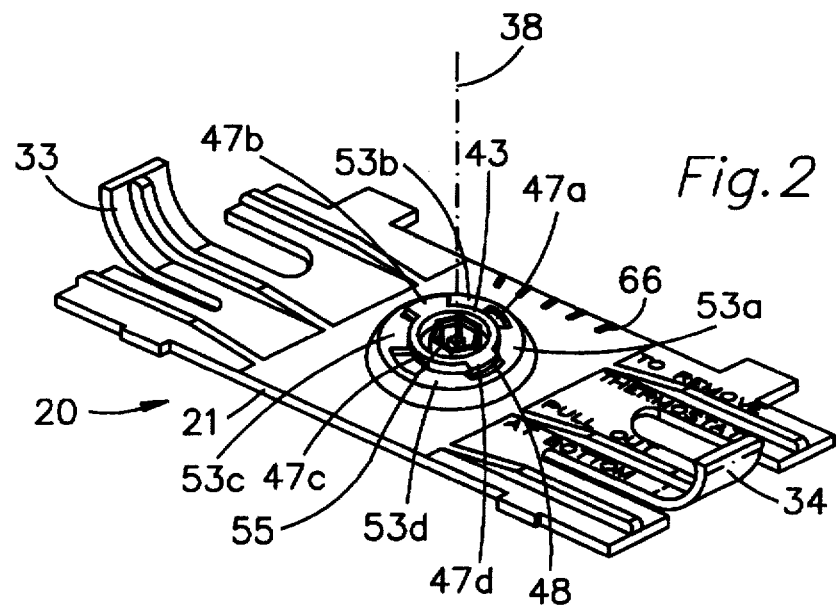
FIG. 2 is a perspective view of the back side of a bimetal coil support for thermometer.

There are a number of further features which I prefer to include in support 20 to improve the convenience of calibration. Referring to FIGS. 2 and 4, an Allen wrench socket 55 on the end of hub 37 opposite projection 43 comprises an adjustment feature. By inserting a properly sized Allen wrench in socket 55, hub 37 can be easily and accurately rotated to indicate the ambient temperature. It is also possible to use other types of adjustment features, such as a screwdriver slot, hex or square bolt head, etc.

A second improvement to support 20 is a scale 66 shown in FIGS. 2 and 4 which replicates the scale 15 shown on housing 10 in FIG. 1. Assuming that pointer 63 projects past the edge of base 21 where scale 66 is located, scale 66 allows adjustment of hub 37 without the necessity of inserting support 20 in housing 10 or of turning over support 20 to see what the current temperature indication of pointer 66 is. This scale thus allows more rapid calibration with absolutely no effect on accuracy. Posts or standoffs 50a–50d form another enhancement. These are designed to project from the surface of base 21 almost exactly the distance which does projection 43. If hub 47 becomes disengaged from base 21 during the calibration procedure, posts 50a–50d assist in realigning tabs 47a–47d with tabs 53a–53d when reengaging hub 37 with base 21. Posts 50a–50d also maintain clearances which assure that support 20 will be installed correctly so that bimetal coil 60 and pointer 63 do not rub or bind on any adjacent surface.

The structure described for support 20 provides an opportunity to use an extremely inexpensive fabrication process alluded to above, and indeed this opportunity is a major justification for using this structure for support 20. I prefer to form both hub 37 and base 21 from styrene plastic in a single injection molding operation using a simple two piece mold. In order to accomplish this, the hub 37 and base 21 are designed to have no overlapping areas when hub 37 is in the position relative to base 21 shown in FIGS. 1–4, hereafter the molding position. In the molding position, none of the tabs 47a–47d interferingly mate with tabs 53a–53d, and therefore hub 37 is not restrained by interference of the tabs 47a–47d with tabs 53a–53d. That is, when hub 37 is in the molding position, adjacent sides of adjacent tabs in one group of tabs 47a–47d or 53a–53d define a space within which fits an axially directed projection of a tab from the other group of tabs. This allows each of the load surfaces on tabs 47a–47d and on 53a–53d to be directly and simultaneously formed by a surface of the mold. It's obvious that surfaces such as the load surfaces on tabs 47a–47d and 53a–53d which are intended to interferingly mate, cannot be easily formed in their mating position by injection molding with a simple two piece mold. Rather, by forming the base 21 and hub 37 in the molding position, both parts can be simultaneously formed by a simple two piece mold, thereby improving tolerances and reducing manufacturing costs.

To further improve efficiency during the manufacturing process, I prefer to provide in the mold itself, features for forming the four webs 56 shown in FIGS. 3 and 4 which connect the ends of each of the tabs 47a–47d to the periphery of opening 48. Webs 56 support hub 37 in the proper axial position for rotation during the calibration step into an angular position for interfering mating of load surfaces on tabs 47a–47d with load surfaces on tabs 53a–53d. In this axial position the load surfaces of hub tabs 47a–47d are in axial alignment with the load surfaces of the base tabs 53a–53d so that the hub tabs 47a–47d can be interferingly mated with the base tabs 53a–53d by simply rotating the hub 37 to fracture the webs 56. Webs 56 are very thin, and are easily fractured when torque is first applied to hub 37 during the calibration step of the assembly process. Thus, after being formed, support 20 can be handled and moved from one station to the next in the manufacturing process prior to calibration without the hub 37 separating from the base 21 with which it was formed. This speeds the assembly process, which is another way of saying that the expense of the assembly process is reduced. At the same time, there is no discernable effect on the quality of the product.

The use of webs 56 also allows bimetal coil 60 to be more easily installed to projection 43 during the assembly process. Hub 37 is relatively small as compared to base 21, and with the larger base 21 holding hub 37 through webs 56, a larger gripping surface is available during these steps of the assembly process.

If bimetal coil 60 is to be initially installed on projection 43 while hub 37 is in the molding position, this initial position of bimetal coil 60 should be angularly oriented at least 20° from the actual calibration position which indicates the current ambient temperature. This requirement insures that there is sufficient overlap of tabs 47a–47d with tabs 53a–53d to firmly and strongly support hub 37 in its calibrated position. This requirement is easy to meet by simply providing slots 46 having the proper angular orientation.

The embodiments of an invention in which an exclusive property or right is claimed are defined as follows:

1. A support for a helical thermometer bimetal coil of the type having internal and external ends, an interior attachment feature forming a part of the internal end and a pointer forming a part of the external end, said support comprising a) a base having an opening having an axis, said base including in the opening at least two centrally projecting base tabs disposed around the periphery of the opening and opposed to each other, each base tab having at least one substantially flat load surface disposed normal to the axis with load surfaces of adjacent base tabs facing in opposite directions, said base tabs having ends collectively defining around the axis a clearance space having a generally circular periphery; and b) a generally cylindrical hub having an axis aligned with the base opening axis and a cross section shape allowing rotation of the hub within the clearance space when so aligned, said hub including a coil support feature for mating with the interior attachment feature of the bimetal coil and for supporting the bimetal coil, said hub further including at least two radially projecting hub tabs, each hub tab including at least one load surface and axially positioned on the hub to interferingly mate a load surface thereof with a corresponding load surface of a base tab over a range of angular positions, wherein at least one of each hub tab and the base tab with which it mates is elastically deflected by the other of the mated hub tab and base tab, whereby the hub is frictionally supported with respect to the base at any angular position within a range of angular positions.

2. The thermometer coil support of claim 1, wherein the base includes at least four tabs and the hub includes at least four tabs.

3. The thermometer coil support of claim 2, wherein the base tabs form a first group of tabs and the hub tabs form a second group of tabs, and wherein all of the tabs in one of the groups are axially aligned with each other, and wherein tabs of the other group are axially displaced with respect to each other.

4. The thermometer coil support of claim 2, wherein the base tabs are axially aligned with each other, and wherein the hub tabs are axially displaced with respect to each other.

5. The thermometer coil support of claim 2, wherein the coil support feature forms at least a part of a first end of the hub, and wherein the hub further comprises a second end in which is an adjustment feature for mating with an adjustment tool, whereby the angular position of the hub may be altered to calibrate a thermometer of which the bimetal coil forms a part.

6. The thermometer coil support of claim 2, wherein the base tabs form a first group of tabs and the hub tabs form a second group of tabs, and each tab has radially extending sides, and wherein adjacent sides of adjacent tabs in one group of tabs define a space within which fits an axially directed projection of an outline of a tab from the other group of tabs.

7. The thermometer coil support of claim 6, wherein the hub is oriented to place the axially directed projections of the tab outlines within the spaces between the base tabs, and further comprising webs connecting a plurality of tabs in one group to the one of the base and the hub which includes the other group of tabs, said webs fracturable by rotation of the hub about its axis relative to the base, said hub connected by said webs to said base to place the load surfaces of the hub tabs in approximate axial alignment with the load surfaces of the base tabs.

8. The thermometer coil support of claim 7, wherein the webs are connected to the hub tabs and to the base.

9. The thermometer coil support of claim 7, wherein the webs are connected to the ends of the hub tabs and to the base.

10. The thermometer coil support of claim 7, further comprising on an end of the hub, an adjustment feature for mating with an adjustment tool, and on the base, a surface carrying a temperature scale adjacent to the adjustment feature on the hub.

11. The thermometer coil support of claim 6, further comprising on an end of the hub, an adjustment feature for mating with an adjustment tool, and on the base, a surface adjacent to the adjustment feature on the hub and carrying a temperature scale.

12. The thermometer coil support of claim 6, wherein at least one load surface includes a projection adjacent a side of the load surface, said projection bearing on the load surface mated with the load surface carrying the projection.

13. The thermometer coil support of claim 6, wherein the tabs are axially aligned in a position causing mating tabs to mutually deflect each other responsive to rotation of the hub relative to the base.

14. The thermometer coil support of claim 2, wherein at least one load surface includes a projection adjacent a side of the load surface, said projection bearing on the load surface mated with the load surface carrying the projection.

15. The thermometer coil support of claim 2, wherein the tabs are axially aligned in a position causing mating tabs to mutually deflect each other responsive to rotation of the hub relative to the base.

* * * * *